United States Patent
Sharifi et al.

(10) Patent No.: US 12,205,591 B2
(45) Date of Patent: Jan. 21, 2025

(54) VOICE QUERY HANDLING IN AN ENVIRONMENT WITH MULTIPLE USERS

(71) Applicant: Google LLC, Mountain View, CA (US)

(72) Inventors: Matthew Sharifi, Kilchberg (CH); Victor Carbune, Zürich (CH)

(73) Assignee: Google LLC, Mountain View, CA (US)

( * ) Notice: Subject to any disclaimer, the term of this patent is extended or adjusted under 35 U.S.C. 154(b) by 287 days.

(21) Appl. No.: 17/938,659

(22) Filed: Oct. 6, 2022

(65) Prior Publication Data

US 2024/0119944 A1 Apr. 11, 2024

(51) Int. Cl.
| | | |
|---|---|---|
| *G10L 15/22* | (2006.01) | |
| *G06F 3/16* | (2006.01) | |
| *G06F 16/638* | (2019.01) | |
| *G10L 17/22* | (2013.01) | |
| *G10L 17/00* | (2013.01) | |

(52) U.S. Cl.
CPC .............. *G10L 15/22* (2013.01); *G06F 3/167* (2013.01); *G06F 16/639* (2019.01); *G10L 17/22* (2013.01); *G10L 2015/223* (2013.01); *G10L 17/00* (2013.01)

(58) Field of Classification Search
None
See application file for complete search history.

(56) References Cited

U.S. PATENT DOCUMENTS

| | | | |
|---|---|---|---|
| 12,001,260 B1 * | 6/2024 | Chemudugunta | ........ G10L 15/22 |
| 2020/0067916 A1 | 2/2020 | Spates, IV et al. | |
| 2020/0177410 A1 | 6/2020 | Iyengar et al. | |
| 2021/0065693 A1 * | 3/2021 | Sharifi | ................ G10L 15/1815 |

OTHER PUBLICATIONS

WIPO. International Search Report and Written Opinion relating to applicaiton No. PCT/US2023/032459 dated Jan. 2, 2024.

* cited by examiner

Primary Examiner — Antim G Shah
(74) Attorney, Agent, or Firm — Honigman LLP; Brett A. Krueger; Grant Griffith

(57) ABSTRACT

A method includes detecting multiple users, receiving a first query issued by a first user, the first query including a command for a digital assistant to perform a first action, and enabling a round robin mode to control performance of actions commanded by queries. The method also includes, while performing the first action, receiving audio data corresponding to a second query including a command to perform a second action, performing speaker identification on the audio data, determining that the second query was spoken by the first user, preventing performing the second action, and prompting at least another user to issue a query. The method further includes receiving a third query issued by a second user, the third query including a command for the digital assistant to perform a third action, and when the digital assistant completes performing the first action, executing performance of the third action.

30 Claims, 11 Drawing Sheets

VOICE QUERY HANDLING IN AN ENVIRONMENT WITH MULTIPLE USERS

TECHNICAL FIELD

This disclosure relates to handling voice queries in an environment with multiple users.

BACKGROUND

A user's manner of interacting with an assistant-enabled device is designed primarily, if not exclusively, by means of voice input. For example, a user may ask a device to perform an action including media playback (e.g., music or podcasts), where the device responds by initiating playback of audio that matches the user's criteria. In instances where a device (e.g., a smart speaker) is commonly shared by multiple users in an environment, the device may need to field multiple actions requested by the users that may compete with one another.

SUMMARY

One aspect of the disclosure provides a computer-implemented method that when executed on data processing hardware causes the data processing hardware to perform operations that include detecting multiple users in an environment of an assistant-enabled device (AED). The operations also include receiving a first query issued by a first user of the multiple users. The first query includes a command for a digital assistant to perform a first action. The operations further include enabling a round robin mode, the round robin mode when enabled causing the digital assistant to control performance of actions commanded by queries subsequent to the first query based on a round robin queue. Here, the round robin queue includes the multiple users detected within the environment of the AED. While the digital assistant is performing the first action and when the round robin mode is enabled, the operations further include receiving audio data corresponding to a second query spoken by one of the multiple users and captured by the AED. Here, the second query includes a command for the digital assistant to perform a second action. The operations also include performing speaker identification on the audio data corresponding to the second query to determine that the second query was spoken by the first user that issued the first query. Based on determining that the second query was spoken by the first user that issued the first query, the operations also include preventing the digital assistant from performing the second action, and prompting at least another user among the multiple users detected in the environment that is different than the first user with an opportunity to issue a query. The operations further include receiving a third query issued by a second user of the multiple users detected in the environment, the third query including a command for the digital assistant to perform a third action, and when the digital assistant completes performing the first action, the operations further include executing performance of the third action.

Implementations of the disclosure may include one or more of the following optional features. In some implementations, prompting at least the other user among the multiple users detected in the environment includes providing, as output from a user interface of a user device associated with the second user, a user-selectable option that when selected issues the third query from the second user to perform the third action. Here, receiving the third query issued by the second user is based on receiving a user input indication indicating selection of the user-selectable option. In these implementations, providing the user-selectable option as output from the user interface may include displaying, via the user interface, the user-selectable option as a graphical element on a screen of the user device associated with the second user. The graphical element prompts the second user with the opportunity to issue the third query. Additionally or alternatively, providing the user-selectable option as output from the user interface includes providing, via the user interface, the user-selectable option as an audible output from a speaker in communication with the data processing hardware. The audible output prompts the second user with the opportunity to issue the third query.

In some examples, the first query further includes a constraint for subsequent queries, the constraint including one of a category of actions, a temporal limit for actions, a temporal limit for the round robin mode, or a threshold number of actions per query. In these examples, the operations further include determining that the second query does not violate the constraint in the first query, and updating the round robin queue to include the second query spoken by the first user. In these examples, the operations may further include detecting that the first user has left the environment of the assistant-enabled device, and updating the round robin queue to remove the second query spoken by the first user.

In some implementations, detecting the multiple users within the environment of the assistant-enabled device includes detecting at least one of the multiple users based on proximity information for a user device associated with the at least one of the multiple users. Additionally or alternatively, detecting the multiple users within the environment of the assistant-enabled device includes receiving image data corresponding to a scene of the environment, and detecting at least one of the multiple users based on the image data. In other implementations, detecting the multiple users within the environment of the assistant-enabled device includes receiving a list indicating each user of the multiple users to add to the round robin queue. In some examples, the round robin queue includes, for each corresponding user of the multiple users detected in the environment, an identity of the corresponding user, and a query count of queries received from the corresponding user. In some implementations, receiving the first query issued by the first user includes receiving, from a user device associated with the first user, a user input indication indicating a user intent to issue the first query.

In some examples, receiving the first query issued by the first user includes receiving initial audio data corresponding to the first query issued by the first user and captured by the assistant-enabled device. In these examples, after receiving the initial audio data corresponding to the first query issued by the first user, the operations further include performing speaker identification on the initial audio data to identify the first user that issued the first query. The speaker identification includes extracting, from the initial audio data corresponding to the first query issued by the first user, a first speaker-discriminative vector representing characteristics of the first query issued by the first user, and determining that the extracted speaker-discriminative vector matches any enrolled speaker vectors stored on the assistant-enabled device. Each enrolled speaker vector is associated with a different respective enrolled user of the assistant-enabled device. When the first speaker-discriminative vector matches one of the enrolled speaker vectors, the operations also include identifying the first user that issued the first query as the respective enrolled user associated with the one of the enrolled speaker vectors that matches the extracted speaker-discriminative vector. In some implementations, performing speaker identification on the audio data corresponding to the second query to determine that the second query was spoken by the first user that issued the first query includes extracting, from the audio data corresponding to the second query, a second speaker-discriminative vector representing characteristics of the second query, and determining that the second extracted speaker-discriminative vector matches a reference speaker vector for the first user.

Another aspect of the disclosure provides a system including data processing hardware and memory hardware in communication with the data processing hardware. The memory hardware stores instructions that when executed by the data processing hardware cause the data processing hardware to perform operations that include detecting multiple users in an environment of an assistant-enabled device (AED). The operations also include receiving a first query issued by a first user of the multiple users. The first query includes a command for a digital assistant to perform a first action. The operations further include enabling a round robin mode, the round robin mode when enabled causing the digital assistant to control performance of actions commanded by queries subsequent to the first query based on a round robin queue. Here, the round robin queue includes the multiple users detected within the environment of the AED. While the digital assistant is performing the first action and when the round robin mode is enabled, the operations further include receiving audio data corresponding to a second query spoken by one of the multiple users and captured by the AED. Here, the second query includes a command for the digital assistant to perform a second action. The operations also include performing speaker identification on the audio data corresponding to the second query to determine that the second query was spoken by the first user that issued the first query. Based on determining that the second query was spoken by the first user that issued the first query, the operations also include preventing the digital assistant from performing the second action, and prompting at least another user among the multiple users detected in the environment that is different than the first user with an opportunity to issue a query. The operations further include receiving a third query issued by a second user of the multiple users detected in the environment, the third query including a command for the digital assistant to perform a third action, and when the digital assistant completes performing the first action, the operations further include executing performance of the third action.

This aspect may include one or more of the following optional features. In some implementations, prompting at least the other user among the multiple users detected in the environment includes providing, as output from a user interface of a user device associated with the second user, a user-selectable option that when selected issues the third query from the second user to perform the third action. Here, receiving the third query issued by the second user is based on receiving a user input indication indicating selection of the user-selectable option. In these implementations, providing the user-selectable option as output from the user interface may include displaying, via the user interface, the user-selectable option as a graphical element on a screen of the user device associated with the second user, the graphical element prompting the second user with the opportunity to issue the third query. Additionally or alternatively, providing the user-selectable option as output from the user interface includes providing, via the user interface, the user-selectable option as an audible output from a speaker in communication with the data processing hardware. The audible output prompts the second user with the opportunity to issue the third query.

In some examples, the first query further includes a constraint for subsequent queries, the constraint including one of a category of actions, a temporal limit for actions, a temporal limit for the round robin mode, or a threshold number of actions per query. In these examples, the operations further include determining that the second query does not violate the constraint in the first query, and updating the round robin queue to include the second query spoken by the first user. In these examples, the operations may further include detecting that the first user has left the environment of the assistant-enabled device, and updating the round robin queue to remove the second query spoken by the first user.

In some implementations, detecting the multiple users within the environment of the assistant-enabled device includes detecting at least one of the multiple users based on proximity information for a user device associated with the at least one of the multiple users. Additionally or alternatively, detecting the multiple users within the environment of the assistant-enabled device includes receiving image data corresponding to a scene of the environment, and detecting at least one of the multiple users based on the image data. In other implementations, detecting the multiple users within the environment of the assistant-enabled device includes receiving a list indicating each user of the multiple users to add to the round robin queue. In some examples, the round robin queue includes, for each corresponding user of the multiple users detected in the environment, an identity of the corresponding user, and a query count of queries received from the corresponding user. In some implementations, receiving the first query issued by the first user includes receiving, from a user device associated with the first user, a user input indication indicating a user intent to issue the first query.

In some examples, receiving the first query issued by the first user includes receiving initial audio data corresponding to the first query issued by the first user and captured by the assistant-enabled device. In these examples, after receiving the initial audio data corresponding to the first query issued by the first user, the operations further include performing speaker identification on the initial audio data to identify the first user that issued the first query. The speaker identification includes extracting, from the initial audio data corresponding to the first query issued by the first user, a first speaker-discriminative vector representing characteristics of the first query issued by the first user, and determining that the extracted speaker-discriminative vector matches any enrolled speaker vectors stored on the assistant-enabled device. Each enrolled speaker vector is associated with a different respective enrolled user of the assistant-enabled device. When the first speaker-discriminative vector matches one of the enrolled speaker vectors, the operations also include identifying the first user that issued the first query as the respective enrolled user associated with the one of the enrolled speaker vectors that matches the extracted speaker-discriminative vector. In some implementations, performing speaker identification on the audio data corresponding to the second query to determine that the second query was spoken by the first user that issued the first query includes extracting, from the audio data corresponding to the second query, a second speaker-discriminative vector representing characteristics of the second query, and determining that the second extracted speaker-discriminative vector matches a reference speaker vector for the first user.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
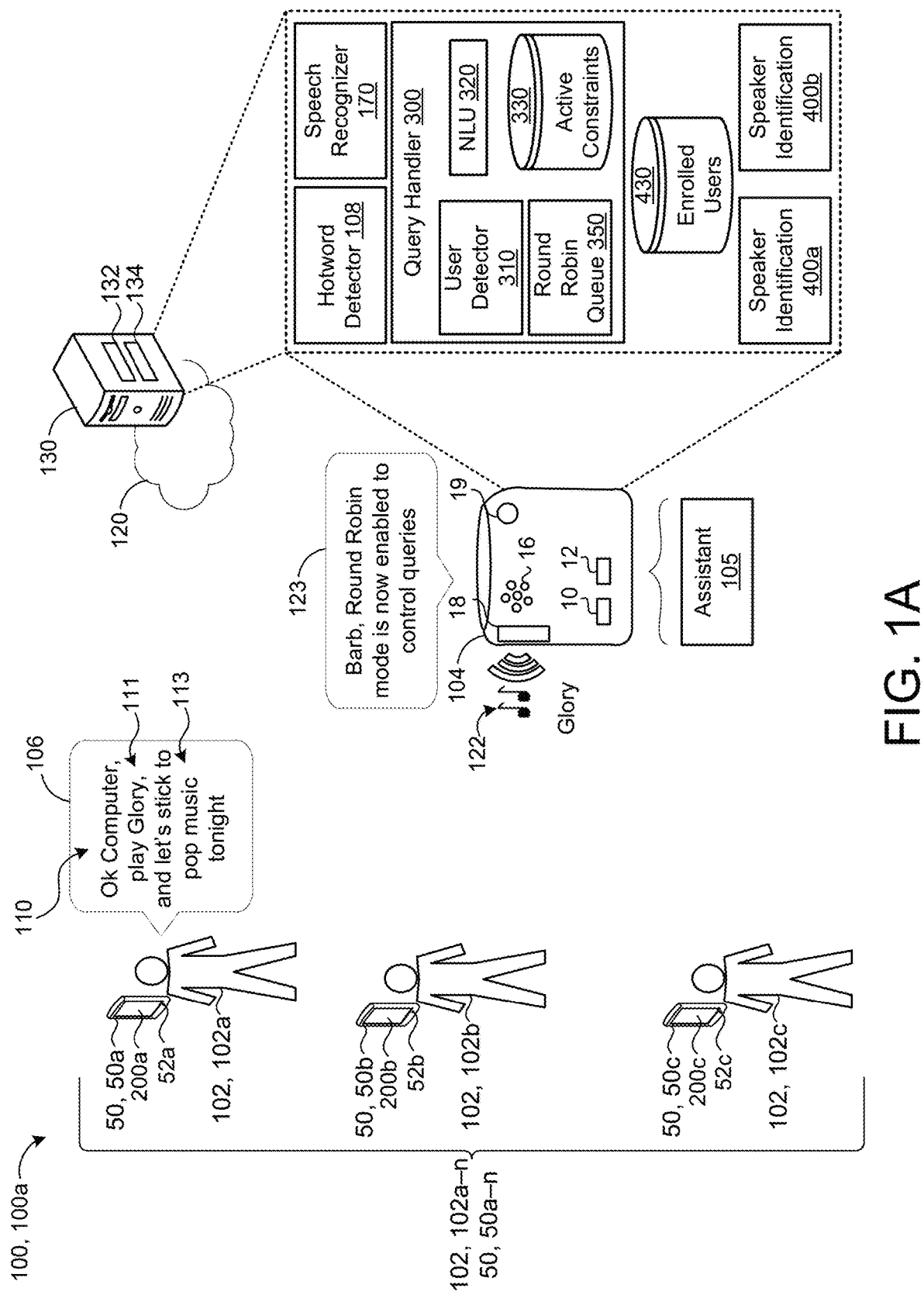
FIGS. 1A-1C are schematic views of an example system including multiple users controlling an assistant-enabled device.

A user's manner of interacting with an assistant-enabled device is designed primarily, if not exclusively, by means of voice input. For example, a user may ask a device to perform an action including media playback (e.g., music or podcasts), where the device responds by initiating playback of audio that matches the user's criteria. In instances where a device (e.g., a smart speaker) is commonly shared by multiple users in an environment, the device may need to field multiple actions requested by the users that may compete with one another. In cases where one or more of the multiple users issue multiple individual requests of the device, the device may respond to the individual requests in an ordered fashion, while proactively prompting users that have not made a request to submit a request. By ensuring that each user in the environment has the opportunity to submit a request to the device, instances where an individual user monopolizes the device are avoided.

Once the device has received the requests from the users, it may implement one or more scheduling strategies to address the individual requests. For example, the device may implement a round robin scheduling strategy where a first request for each user is individually addressed in order before a subsequent request from each user is addressed. Alternatively, the device may implement a scheduling strategy based on a length of the requested action, an importance of the requested action, or a priority of a requested action. For example, the device may grant priority to requests submitted by a host of an event. Similarly, the device may implement a scheduling strategy that splits users into multiple queues, where each queue in the multiple queues corresponds to a type of action (e.g., play audio, control lights, etc.).

In addition to controlling the action of playing to prevent a single user from monopolizing a playlist, the device may control other types of media such as podcasts and videos. Similarly, the device may prevent a single user from monopolizing the device with multiple follow up questions by prompting other users present to submit a question before answering the multiple follow up questions. This additionally may extend into controlling aspects of a home connected to the device. For example, a host of a party may seek to control the lighting levels or type of music played during a party to ensure a soothing atmosphere. The host may speak "only allow lighting below 60% and jazz music." For a duration of the party, the device may prevent or limit the extent to which other attendees at the party can adjust the lighting levels, and bar attendees from requesting music outside of the jazz music genre.

In addition to limiting individuals, the device may operate to be more inclusive of individuals present in a home. For example, the device may help individuals in an environment create a shopping list, thereby ensuring all individuals are given the opportunity to add items to the shopping list. For instance, the device may prompt an individual to add an item to a shopping list in response to an initial individual issuing a query to add multiple items to the shopping list. Similarly, the device may proactively prompt individuals to participate in an event, such as setting an alarm in the morning. Here, the device may suggest that an individual requests an alarm in response to receiving a request to set an alarm for/from a different individual. Moreover, the device may ensure individuals are not left out of an interaction, by engaging/prompting an individual that has not recently spoken to join the interaction between the device and another individual in proximity to the individual.

Figure 1B:
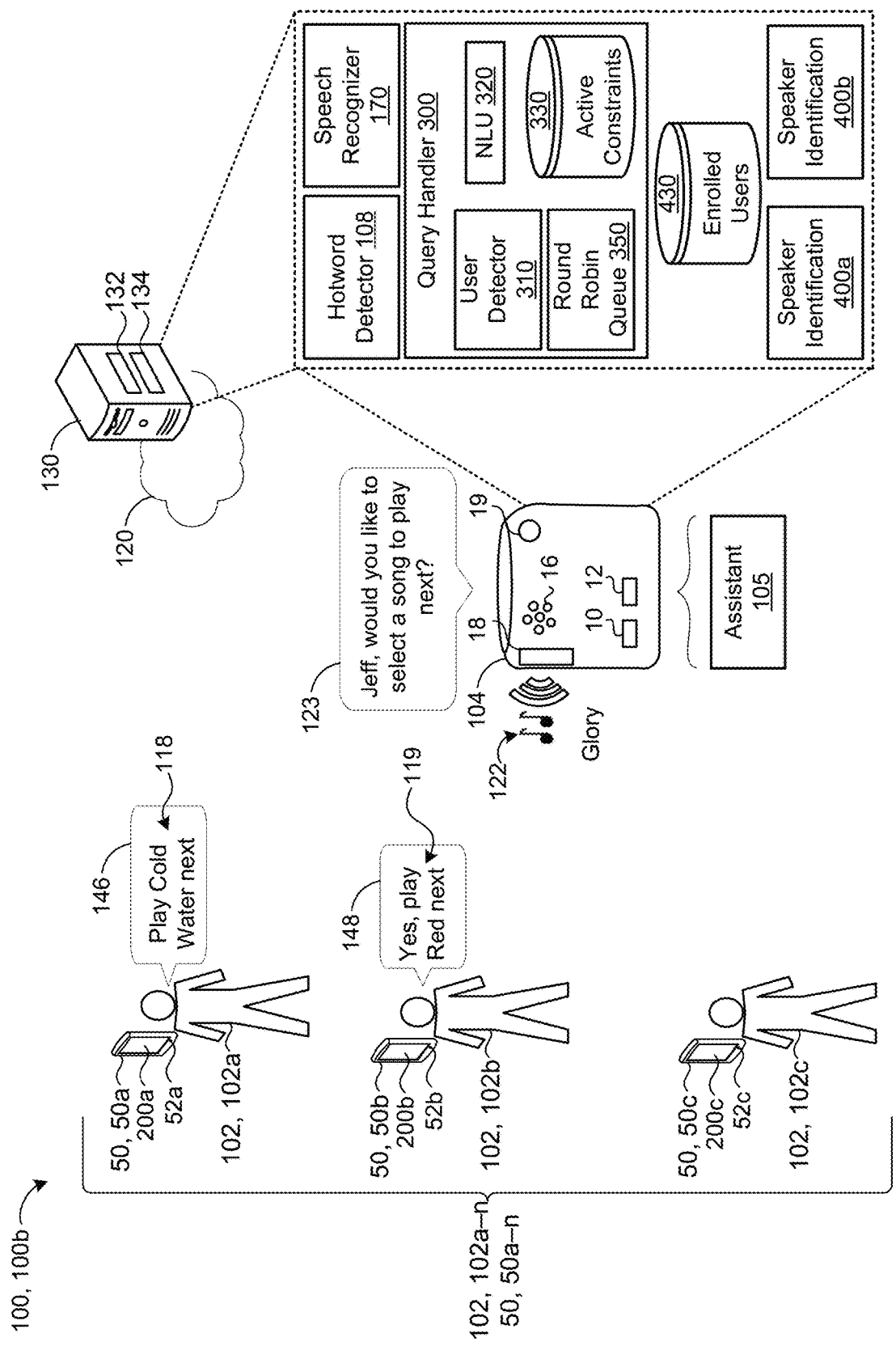
Figure 1C:
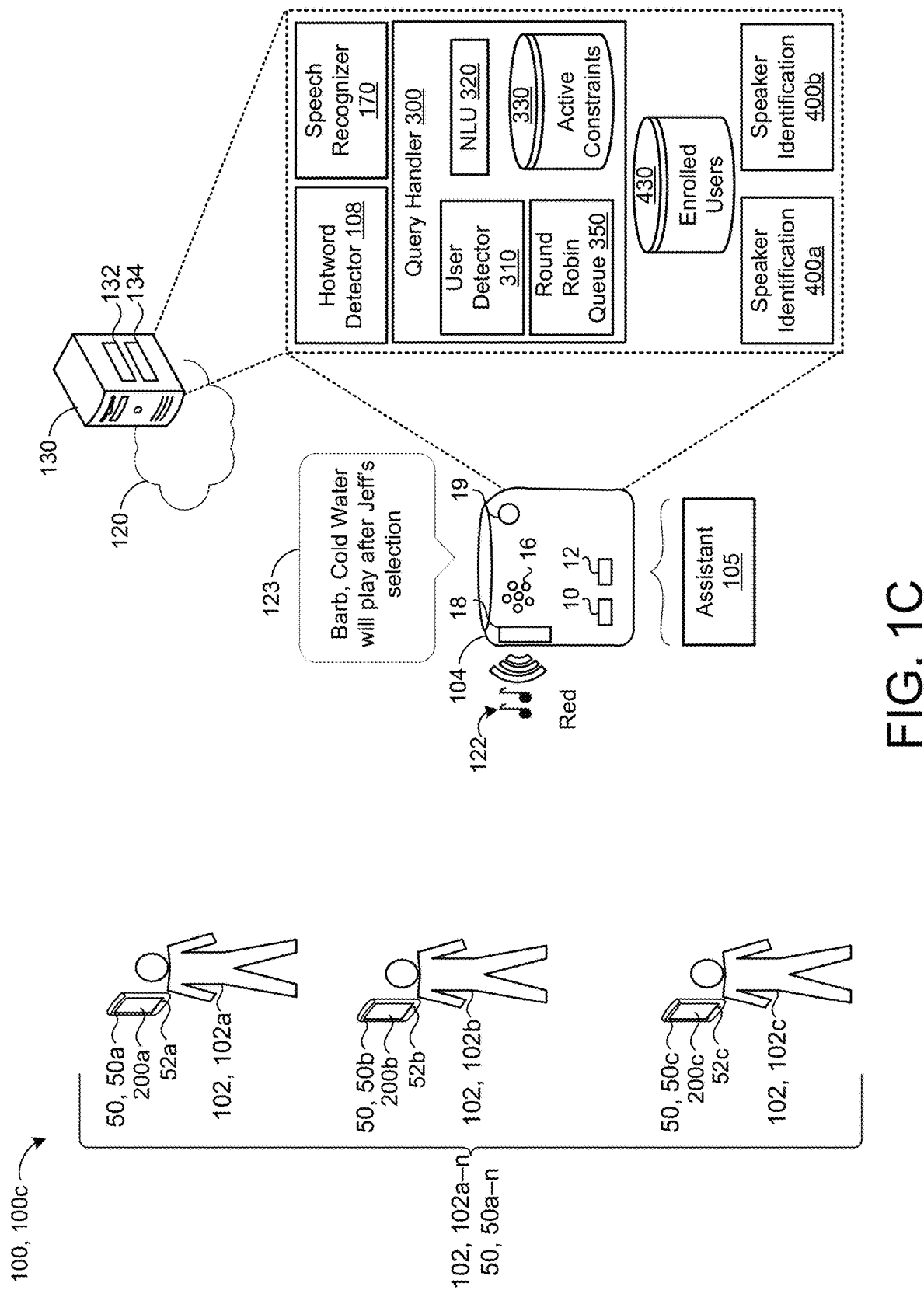

FIGS. 1A-1C illustrate example systems 100a-c for handling queries in an environment with multiple users 102, 102a-n using a scheduling strategy that employs a round robin mode that proactively engages the multiple users 102 detected in the environment based on a round robin queue 350. Briefly, and as described in more detail below, an assistant-enabled device (AED) 104 including a query handler 300 (FIG. 3) detects multiple users 102, 102a-c within the environment, and begins to play music 122 in response to receiving a first query 106, "Ok computer, play Glory, and let's stick to pop music tonight," issued by a user 102a. While the AED 104 is performing the action of playing the music 122 as playback audio from a speaker 18, the AED 104 receives a second query 146 "Play Cold Water next," spoken by the same user 102a (FIG. 1). Because the query handler 300 detects/recognizes that other users 102b, 102c are present in the environment, the query handler 300 prompts one or more of the other users 102b, 102c to issue a query to add to the round robin queue 350 before performing an action associated with the second query 146 issued by the user 102a.

Figure 3:
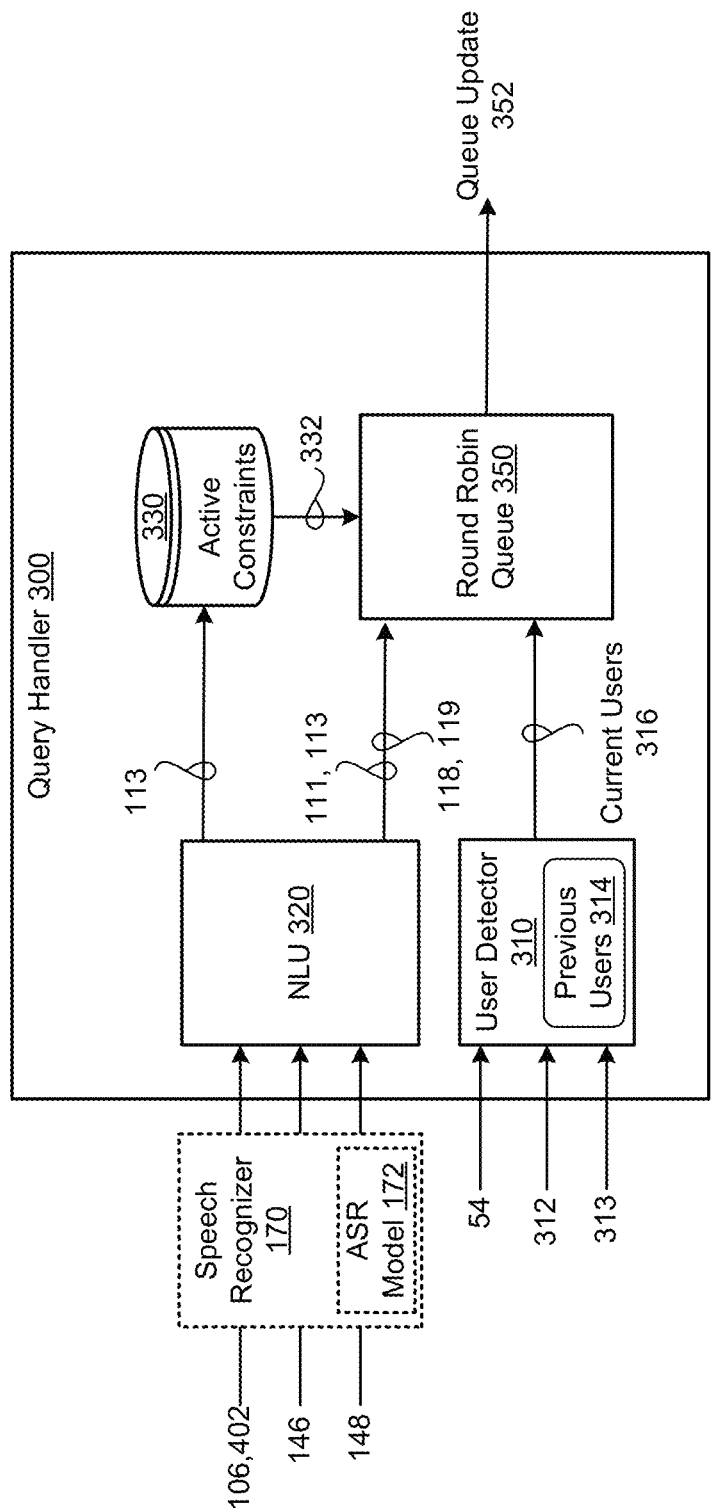
FIG. 3 is a schematic view of a query handling process.

The systems 100a-100c include the AED 104 executing a digital assistant 105 that the multiple users 102 may interact with by issuing queries including commands to perform an action. In the example shown, the AED 104 corresponds to a smart speaker that the multiple users 102 may interact with. However, the AED 104 can include other computing devices, such as, without limitation, a smart phone, tablet, smart display, desktop/laptop, smart watch, smart glasses/headset, smart appliance, headphones, or vehicle infotainment device. The AED 104 includes data processing hardware 10 and memory hardware 12 storing instructions that when executed on the data processing hardware 10 cause the data processing hardware 10 to perform operations. The AED 104 includes an array of one or more microphones 16 configured to capture acoustic sounds such as speech directed toward the AED 104. The AED 104 may also include, or be in communication with, an audio output device (e.g., speaker) 18 that may output audio such as music 122 and/or synthesized speech from the digital assistant 105. Additionally, the AED 104 may include, or be in communication with, one or more cameras 19 configured to capture images within the environment and output image data 312 (FIG. 3).

In some configurations, the AED 104 is in communication with multiple user devices 50, 50a-n associated with the multiple users 102. In the examples shown, each user device 50 of the multiple user devices 50a-c includes a smart phone that the respective user 102 may interact with. However, the user device 50 can include other computing devices, such as, without limitation, a smart watch, smart display, smart glasses, a smart phone, smart glasses/headset, tablet, smart appliance, headphones, a computing device, a smart speaker, or another assistant-enabled device. Each user device 50 of the multiple user devices 50a-n may include at least one microphone 52, 52a-n residing on the user device 50 that is in communication with the AED 104. In these configurations, the user device 50 may also be in communication with the one or more microphones 16 residing on the AED 104. Additionally, the multiple users 102 may control and/or configure the AED 104, as well as interact with the digital assistant 105, using an interface 200, such as a graphical user interface (GUI) 200, 200a-n rendered for display on a respective screen of each user device 50.

As shown in FIGS. 1A-1C and 3, the digital assistant 105 implementing the query handler 300 manages queries issued by the multiple users 102 using the round robin queue 350. In some implementations, the query handler 300 maintains a log of the detected users 102 in the environment and one or more queries received from the each of the users 102 in the round robin queue 350 and ensures that the digital assistant 105 performs actions associated with the received queries in an ordered fashion according to the round robin queue 350. In this sense, the query handler 300 maintains an order for the queries received from the multiple users 102 within the round robin queue 350 and prevents a single user 102 from monopolizing the digital assistant 105 with consecutive queries. Moreover, the query handler 300 may facilitate adding additional and/or conflicting queries from the multiple users 102 to the round robin queue 350.

In some examples, the query handler 300 identifies metadata in the issued queries that dictates the order of the actions logged within the round robin queue 350. Here, the metadata of an issued query to "play" a song may include a length or a tempo of a song, where the query handler 300 may execute performance of consecutive short songs, but separate two long songs with other songs in between to avoid executing performance of consecutive long songs. Likewise, the query 300 may group similar genres or tempos of music together within the constraints of the round robin queue 350 to provide smoother transitions between actions.

Figure 2A:
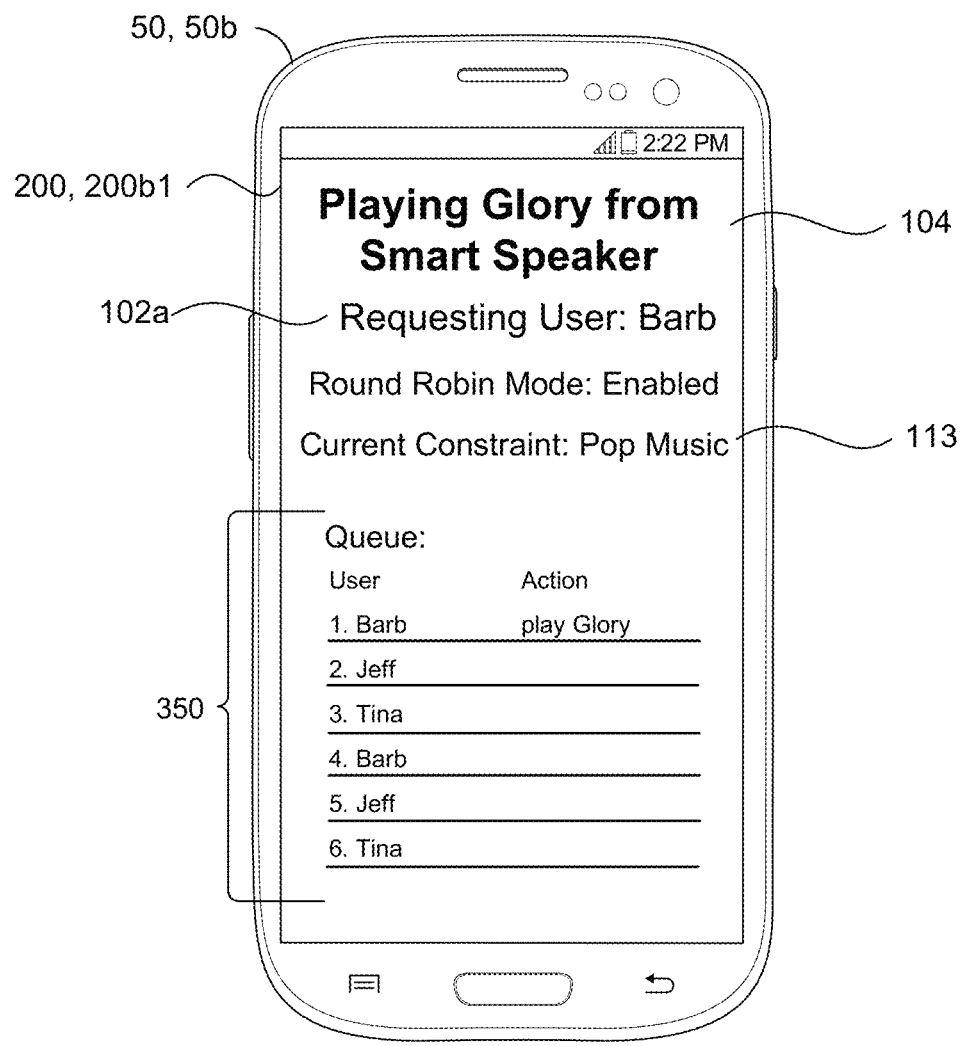
FIGS. 2A-2C are example GUIs 200a-c rendered on the screen of a user device to display a round robin queue.
Figure 2B:
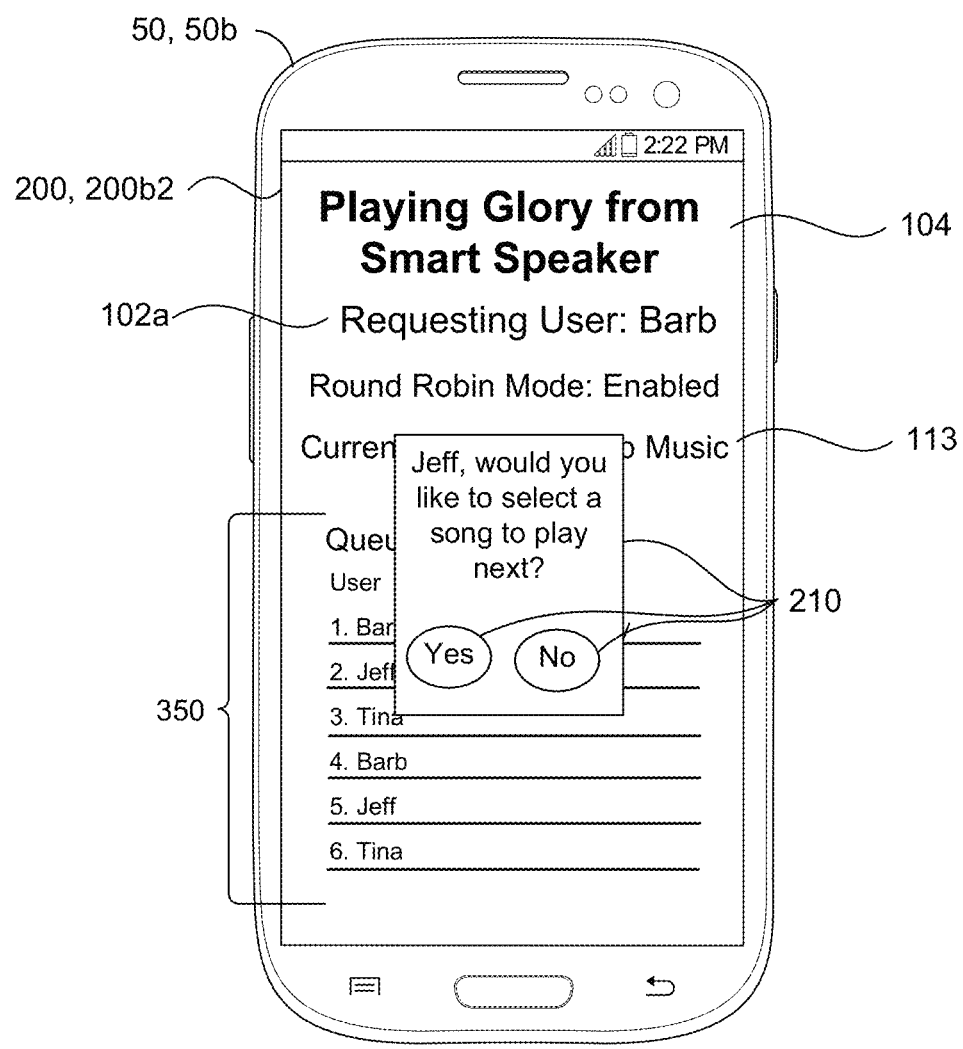
Figure 2C:
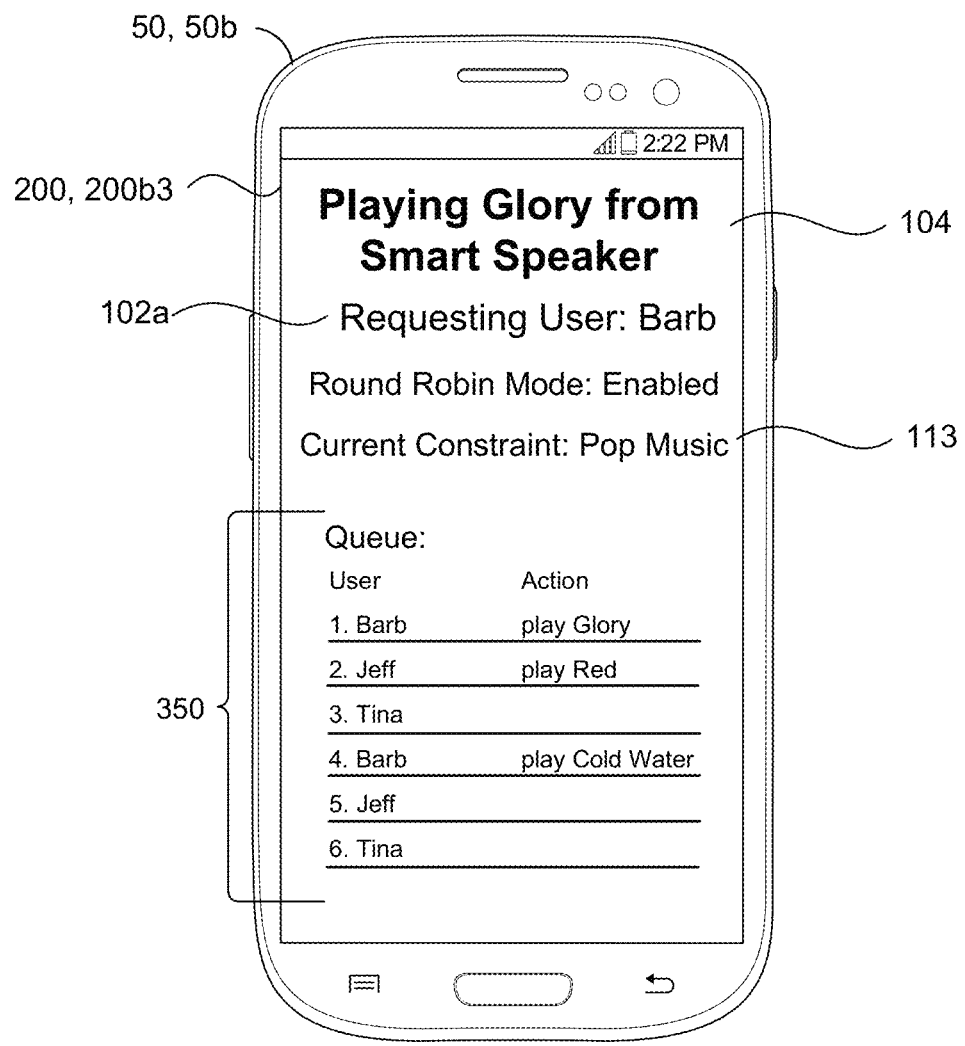

The GUI 200 of each respective user device 50 associated with a user 102 may display the round robin queue 350 including an identity of the detected users 102 and the queries associated with each respective user 102. For example, the round robin queue 350 includes, for each user 102 of the multiple users 102 detected in the environment, an identity of the corresponding user 102, and a query count of the queries received from the corresponding user 102. The query count may refer to a number of songs the user 102 has submitted, where each song corresponds to an entry in the round robin queue 350, or to a number of actions the user 102 submitted, where each entry in the round robin queue 350 corresponds to an action that may include multiple songs. In some configurations, the AED 104 includes a screen and renders the GUI 200 for displaying the round robin queue 350 thereon. For instance, the AED 104 may include a smart display, tablet, or smart tv within the environment. FIGS. 2A-2C provide example GUIs 200b1-200b3 displayed on a screen of a user device 50b associated with a user 102b to keep the user 102b apprised of the status of the round robin queue 350. Additionally, the GUI 200 may render for display an identifier of the current action (e.g., "Playing Glory"), an identifier of the AED 104 (e.g., smart speaker) that is currently performing the action, and/or an identity of the user 102a (e.g., Barb) that initiated the current action being performed by the digital assistant 105. As mentioned above, by enabling a round robin mode including the query handler 300 managing the round robin queue 350, the AED (e.g., via the digital assistant 105) will prevent performance (or at least require approval from the other users 102b, 102c) of a second action when the AED 104 determines (e.g., by the query handler 300) that Barb 102a already issued a first action logged in the round robin queue 350.

With continued reference to FIGS. 1A-1C and 3, during execution of the digital assistant 105, the AED 104 detects the multiple users 102a-c in the environment using a user detector 310 of the query handler 300. For example, the query handler 300 receives proximity information 54 (FIG. 3) for the location of each of the multiple users 102a-c relative to the AED 104 via the user detector 310. In some implementations, each user device 50a-c of the multiple users 102 broadcasts proximity information 54 receivable by the user detector 310 that the AED 104 may use to determine the proximity of each user device 50 relative to the AED 104. The proximity information 54 from each user device 50 may include wireless communication signals, such as WiFi, Bluetooth, or Ultrasonic, in which the signal strength of the wireless communication signals received by the user detector 310 may correlate proximities (e.g. distances) of the user device 50 relative to the AED 104. In implementations where a user 102 does not have a user device 50, or has a user device 50 that does not share proximity information 54, the user detector 310 may detect the users 102 based on an explicit input (e.g., a guest list) 313 received from the user 102a that issued the first query 106. For example, the user detector 310 receives a guest list 313 from a seed user 102 (e.g., user 102a) indicating each user 102 of the multiple users 102 to add to the round robin queue 350. In other implementations, the user detector 310 automatically detects the multiple users 102 in the environment by receiving image data 312 corresponding to a scene of the environment and obtained by the camera 19. Here, the user detector 310 detects the multiple users 102 based on the received image data 312. Similarly, the user detector 310 may detect the multiple users 102 in the environment by performing speaker identification (FIGS. 4A and 4B) to resolve the identity of a user 102 within the environment that issues a query by speaking. Here, the user detector 310 detects the multiple users 102 based on received audio data 402 associated with the issued queries, and the user detector 310 may continue to detect a user 102 that issued a query (and associated audio data 402) for a threshold amount of time after the user 102 spoke.

In some implementations, the user detector 310 maintains a list of previous users 314 present in the environment of the AED 104. Here, the list of the previous users 314 may refer to list of the users 102 previously detected by the user detector 310 that may include one or more users not in the most recent (i.e., most current) detection of users 102 and/or the most current detection of users 102 may include one or more additional users not in the list of previous users 314. In this example, after receiving the proximity information 54, image data 312, and/or guest list, the user detector 310 may determine that the list of previous users 314 do not include the same users 102 associated with a current state of the environment (i.e., a list of current users 316). In other words, the user detector 310 may determine that the users 102 in the list of previous users 314 is different than the users 102 in the list of current users 316. This change between the list of the previous users 314 and the list of the current users 316 triggers the query handler 300 to update the round robin queue 350 to add or remove entries in the round robin queue 350 based on the list of the current users 316 and generate an update 352 to display in the GUI 300 of each user device 50 associated with a detected user 102. For example, if the user 102a leaves the environment, the user detector 310 may detect that the user 102a has left by comparing the list of previous users 314 including the users 102a against the list of the current users 314 that does not include the user 102a. In response, the query handler 300 updates the round robin queue 350 to remove any queries issued by the user 102a and generates an update to the round robin queue 350. In some examples, however, when the user detector 310 determines that the list of previous users 314 is the same as the detected list of the current users 316, the user detector 310 may not send the list of the current users 316 to update the round robin queue 350.

In some examples, the user detector 310 only outputs the list of the current users 316 (thereby triggering the query handler to generate an update 352 to the round robin queue 350) when there is a difference between the list of the previous users 314 and the list of the current users 316. For instance, the user detector 310 may be configured with a change threshold and, when the difference detected between the list of the previous users 314 and the list of the current users 316 satisfies the change threshold (e.g., exceeds the threshold), the user detector 310 outputs the list of the current users 316 to the query handler 300 The threshold may be zero, where the slightest difference (e.g., as soon as a user 102 enters or exits the environment) between the list of the previous users 314 and the list of the current users 316 detected by the indication determiner 210 may trigger the query handler 300 to update the round robin queue 350. Conversely, the threshold may be higher than zero to prevent unnecessary updates to the round robin queue 350 as a type of queue-interruption sensitivity mechanism. For example, the change threshold may be temporal (e.g., an amount of time), where the AED 104 does not update the round robin queue 350 if a user 102 has temporarily left the environment (e.g., went to a different room), but has returned in a threshold amount of time. Here, the user detector 310 only outputs the list of the current users 316, thereby updating the round robin queue (350) when the difference between the list of the previous users 314 and the list of the current users 316 continues for a threshold amount of time.

Referring again to FIGS. 1A-1C, the user detector 310 may identify the user 102a (e.g., Barb) and the user 102b (e.g., Jeff) via proximity information 54 received from their respective user devices 50a, 50b. In this example, the user detector 310 may not detect the user 102c by detecting the user device 50c (e.g., the user 102c chose not to share proximity information 54 from the user device 50c). However, the user detector 310 still detects the presence of the user 102c (e.g., via speech data, image data, and/or inputs from the other users 102a, 102b), and outputs the list of the current users 316. Thereafter, the query handler 300 adds the list of the current users 316 including the detected users 102a-c to the round robin queue 350 that logs the queries issued by the users 102a-c Continuing with the example in FIG. 1A, the user 102a of the multiple users 102a-c is shown issuing a first query 106, "Ok computer, play Glory, and let's stick to pop music tonight" in the vicinity of the AED 104. Here, the first query 106 issued by the user 102a is spoken by the user 102a and includes initial audio data 402 (FIG. 3) corresponding to the first query 106. The first query 106 may further include a user input indication indicating a user intent to issue the first query, via any one or of touch, speech, gesture, gaze, and/or an input device (e.g., mouse or stylus) for interacting with the AED 104. Optionally, based on receiving the initial audio data 402 corresponding to the first query 106, the query handler 300 resolves the identity of the speaker of the first query 106 by performing a speaker identification process 400a (FIG. 4A) on the audio data 402 and determining that the first query 106 was issued by the user 102a. In other implementations, the user 102a issues the first query 106 without speaking. In these implementations, the user 102a issues the first query 106 via a user device 50a associated with the user 102a (e.g., entering text corresponding to the first query 106 into the GUI 200a displayed on the screen of the user device 50a, selecting the first query 106 displayed on the screen of the user device 50a, etc.,). Here, the AED 104 may resolve the identity of the user 102 that issued the first query 106 by recognizing the user device 50a associated with the user 102a.

The microphone 16 of the AED 104 receives the first query 106 and processes the initial audio data 402 that corresponds to the first query 106. The initial processing of the audio data 402 may involve filtering the audio data 402 and converting the audio data 402 from an analog signal to a digital signal. As the AED 104 processes the audio data 402, the AED may store the audio data 402 in a buffer of the memory hardware 12 for additional processing. With the audio data 402 in the buffer, the AED 104 may use a hotword detector 108 to detect whether the audio data 402 includes the hotword. The hotword detector 108 is configured to identify hotwords that are included in the audio data 402 without performing speech recognition on the audio data 402.

In some implementations, the hotword detector 108 is configured to identify hotwords that are in the initial portion of the first query 106. In this example, the hotword detector 108 may determine that the first query 106 "Ok computer, play Glory, and let's stick to pop music tonight" includes the hotword 110 "ok computer" if the hotword detector 108 detects acoustic features in the audio data 402 that are characteristic of the hotword 110. The acoustic features may be mel-frequency cepstral coefficients (MFCCs) that are representations of short-term power spectrums of the first query 106 or may be mel-scale filterbank energies for the first query 106. For example, the hotword detector 108 may detect that the first query 106 "Ok computer, play Glory, and let's stick to pop music tonight" includes the hotword 110 "ok computer" based on generating MFCCs from the audio data 402 and classifying that the MFCCs include MFCCs that are similar to MFCCs that are characteristic of the hotword "ok computer" as stored in a hotword model of the hotword detector 108. As another example, the hotword detector 108 may detect that the first query 106 "Ok computer, play Glory, and let's stick to pop music tonight" includes the hotword 110 "ok computer" based on generating mel-scale filterbank energies from the audio data 402 and classifying that the mel-scale filterbank energies include mel-scale filterbank energies that are similar to mel-scale filterbank energies that are characteristic of the hotword "ok computer" as stored in the hotword model of the hotword detector 108.

When the hotword detector 108 determines that the initial audio data 402 that corresponds to the first query 106 includes the hotword 110, the AED 104 may trigger a wake-up process to initiate speech recognition on the audio data 402 that corresponds to the first query 106. For example, FIG. 3 shows the AED 104 including a speech recognizer 170 employing an automatic speech recognition model 172 that may perform speech recognition or semantic interpretation on the audio data 402 that corresponds to the first query 106. The speech recognizer 170 may perform speech recognition on the portion of the audio data 402 that follows the hotword 110. In this example, the speech recognizer 170 may identify the words "play Glory, and let's stick to pop music tonight" in the first query 106.

In some examples, the AED 104 is configured to communicate with a remote system 130 via a network 120. The remote system 130 may include remote resources, such as remote data processing hardware 132 (e.g., remote servers or CPUs) and/or remote memory hardware 134 (e.g., remote databases or other storage hardware). The query handler 300 may execute on the remote system 130 in addition to, or in lieu of the AED 104. The AED 104 may utilize the remote resources to perform various functionality related to speech processing and/or synthesized playback communication. In some implementations, the speech recognizer 170 is located on the remote system 130 in addition to, or in lieu of, the AED 104. Upon the hotword detector 108 triggering the AED 104 to wake-up responsive to detecting the hotword 110 in the first query 106, the AED 104 may transmit the initial audio data 402 corresponding to the first query 106 to the remote system 130 via the network 120. Here, the AED 104 may transmit the portion of the initial audio data 402 that includes the hotword 110 for the remote system 130 to confirm the presence of the hotword 110. Alternatively, the AED 104 may transmit only the portion of the initial audio data 402 that corresponds to the portion of the utterance 106 after the hotword 110 to the remote system 130, where the remote system 130 executes the speech recognizer 170 to perform speech recognition and returns a transcription of the initial audio data 402 to the AED 104.

With continued reference to FIGS. 1A-1C and 3, the query handler 300 may further include a natural language understanding (NLU) module 320 that performs semantic interpretation on the first query 106 to identify the query/command directed toward the AED 104. Specifically, the NLU module 320 identifies the words in the first query 106 identified by the speech recognizer 170, and performs semantic interpretation to identify any speech commands in the first query 106. The NLU module 320 of the AED 104 (and/or the remote system 130) may identify the words "play Glory" as a command 111 to perform a first action (i.e., play music 122), and the words "and let's stick to pop music tonight" as a constraint 113 to limit actions commanded by queries subsequent to the first query 106. In the example shown in FIG. 1A, the digital assistant 105 begins to perform the first action of playing music 122 as playback audio (e.g., Track #1) from the speaker 18 of the AED 104. The digital assistant 105 may stream the music 122 from a streaming service (not shown) or the digital assistant 105 may instruct the AED 104 to play music stored on the AED 104. Additionally, the query handler 300 enables the round robin mode including the round robin queue 350. The round robin mode, when enabled, causes the digital assistant 105 to control performance of actions commanded by queries subsequent to the first query 106 based on the round robin queue 350. Here, the round robin queue 350 includes the list of the current users 316 including the multiple users 102*a-c* detected by the user detector 310 within the environment of the AED 104. In the example, in response to receiving the constraint 113 in the first query 106, the query handler 300 limits actions of the digital assistant 105 to only play music of a certain genre (i.e., pop music).

In the example shown in FIG. 1A while referring to FIG. 3, the query handler 300 enables the round robin mode including the round robin queue 350, and adds the constraint 113 to an active constraints data store 330. The query handler 300 maintains a record of active constraints 332 in the an active constraints data store 330 (e.g., stored on the memory hardware 12), and the query handler 300 may limit which actions are added to the round robin queue 350 for the digital assistant 105 to perform based on the active constraints 332. For example, the query handler 300 may first verify that the command 111 and/or the constraint 113 in the first query 106 do not conflict with any active constraints 332 before performing the first action associated with the command 111 and adding the action "play Glory" to the round robin queue (FIG. 2A).

The AED 104 may notify the user 102*a* (e.g., Barb) that issued the first query 106 that the round robin mode is enabled to control (e.g., queue) subsequent queries using the round robin queue 350. For instance, the digital assistant 105 may generate synthesized speech 123 for audible output from the speaker 18 of the AED 104 that states, "Barb, round robin mode is now enabled to control queries". In additional examples, the digital assistant 105 provides a notification (e.g., update 352) to the user device 50*a* associated with the user 102*a* (e.g., Barb) to inform the user 102*a* of the entries in the round robin queue 350 and/or any active constraints 232 stored in the active constraints data store 330.

Referring to FIGS. 2A-2C, a graphical user interface (GUI) 200 executing on the user device 50 may display the round robin queue 350 including the detected users 102 and queries associated with each detected user 102. As used herein, the GUI 200 may receive user input indications via any one or of touch, speech, gesture, gaze, and/or an input device (e.g., mouse or stylus) for interacting with the round robin queue 350 (via the digital assistant 105). Each listed action may serve as a descriptor identifying the respective command 111 for the digital assistant 105 to perform an action. FIG. 2A provides an example GUI 200*b*1 displayed on a screen of the user device 50*b* to inform the user 102*b* of the contents in the round robin queue 350. Specifically, the GUI 200*b*1 renders the round robin queue 350 including the user 102*a* (Barb), the user 102*b* (Jeff), and the user 102*c* (Tina) in a repeat order. The round robin queue 350 additionally includes placeholders for queries for each of the users 102*a-c*. As shown, the first entry for the user 102*a* (Barb) includes the corresponding action 111 to "play Glory," while subsequent entries for the user 102*a* and the other users 102*b*, 102*c* (Jeff, Tina) are empty. In other words, the round robin queue 350 includes, for each user 102 of the multiple detected users 102*a-c*, the identity of the user 102 (e.g., Barb, Jeff, Tina), and a query count of queries including actions received from the corresponding user 102. As shown, the user 102*a* (Barb) has a single query count corresponding to the action "play Glory," while the user 102*b* (Jeff) and the user 102*c* (Tina) have no queries in the round robin queue 350.

Additionally, the GUI 200 may render for display an identifier of current action (e.g., "Playing Glory"), an identifier of the AED 104 (e.g., smart speaker) that is currently performing action, an indicator that the round robin mode is enabled, and/or an identity of the user 102a (e.g., Barb) that issued the first query 106. In implementations where the first query 106 includes the constraint 113, the GUI 200 renders, for display, an identifier of the constraint 113 (e.g., pop music). Accordingly, the user 102b may consult the user device 50b to review the current actions of the digital assistant 105 and any constraints 113 that will limit queries issued by the users 102.

Figure 4A:
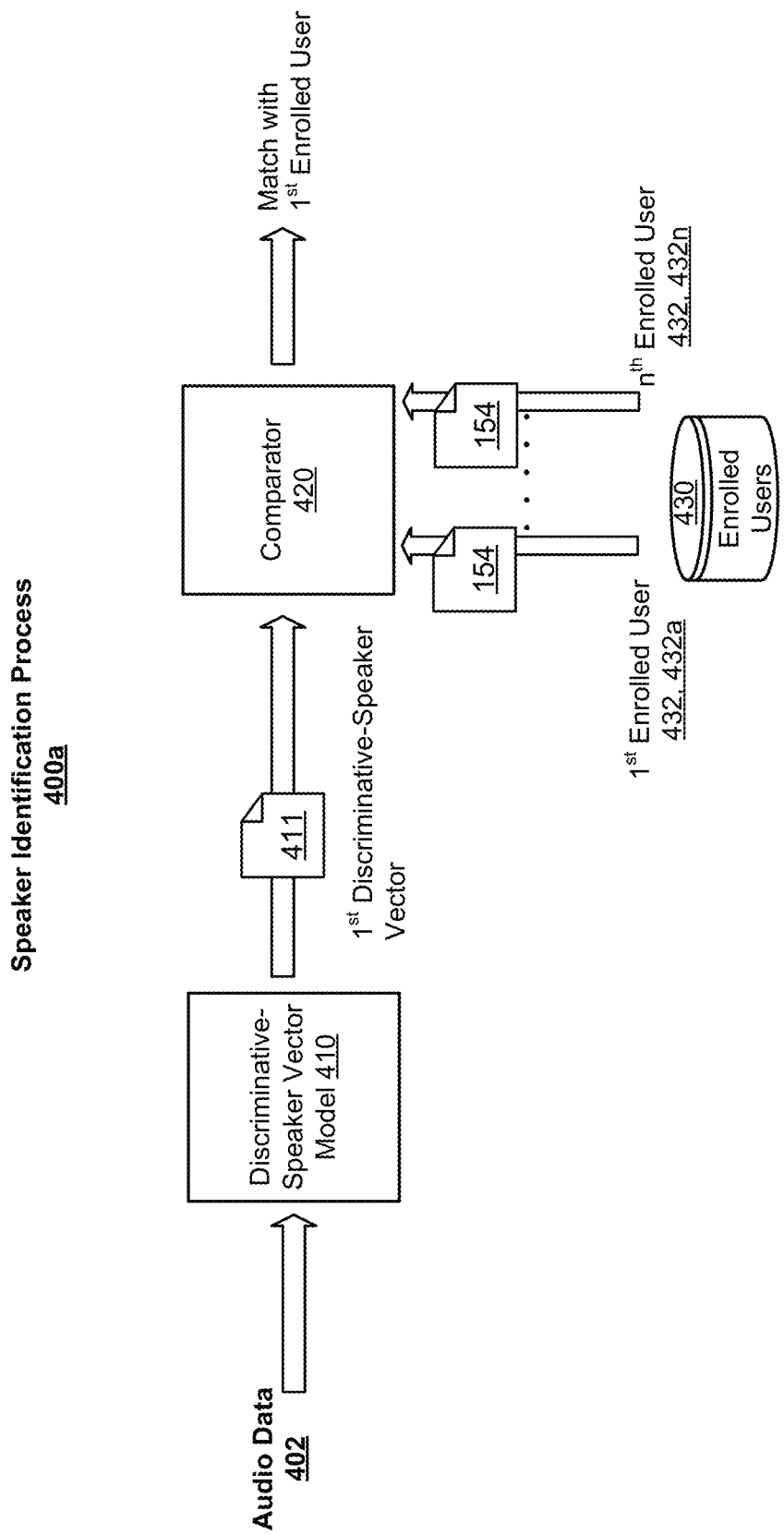
FIG. 4A is a schematic view of a speaker identification process.
Figure 4B:
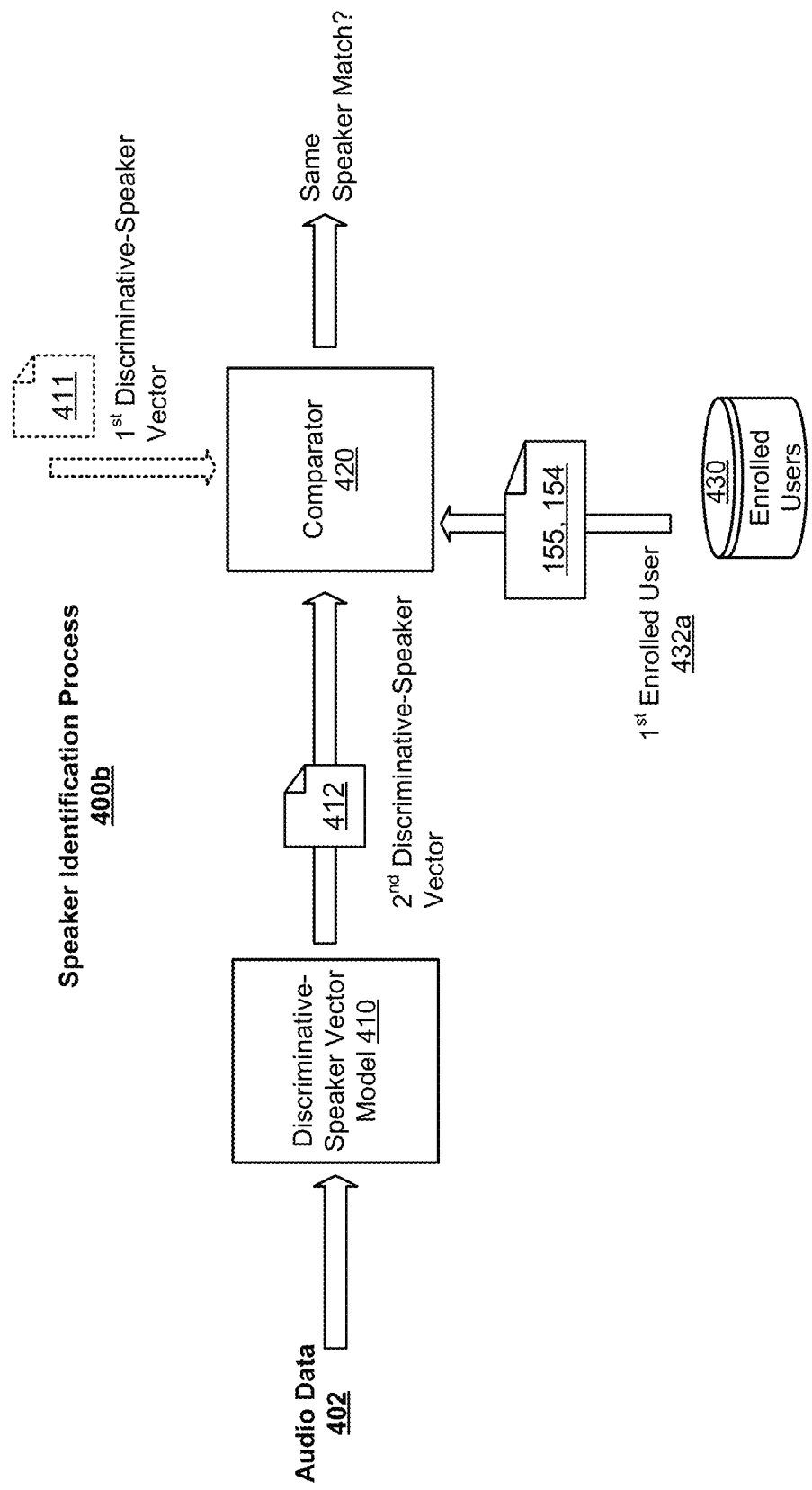
FIG. 4B is schematic views of a speaker verification process.

Referring FIGS. 4A and 4B, in some implementations, the AED 104 (or the remote system 130 in communication with the AED 104) also includes an example data store 430 storing enrolled user data/information for each of multiple enrolled users 432a-n of the AED 104. Here, each enrolled user 432 of the AED 104 may undertake a voice enrollment process to obtain a respective enrolled speaker vector 154 from audio samples of multiple enrollment phrases spoken by the enrolled user 432. For example, a speaker-discriminative model 410 may generate one or more enrolled speaker vectors 154 from the audio samples of enrollment phrases spoken by each enrolled user 432 that may be combined, e.g., averaged or otherwise accumulated, to form the respective enrolled speaker vector 154. One or more of the enrolled users 432 may use the AED 104 to conduct the voice enrollment process, where the microphone 16 captures the audio samples of these users speaking the enrollment utterances and the speaker-discriminative model 410 generates the respective enrolled speaker vectors 154 therefrom. The model 410 may execute on the AED 104, the remote system 130, or a combination thereof. Additionally, one or more of the enrolled users 432 may enroll with the AED 104 by providing authorization and authentication credentials to an existing user account with the AED 104. Here, the existing user account may store enrolled speaker vectors 154 obtained from a previous voice enrollment process with another device also linked to the user account.

In some examples, the enrolled speaker vector 154 for an enrolled user 432 includes a text-dependent enrolled speaker vector. For instance, the text-dependent enrolled speaker vector may be extracted from one or more audio samples of the respective enrolled user 432 speaking a predetermined term such as the hotword 110 (e.g., "Ok computer") used for invoking the AED 104 to wake-up from a sleep state. In other examples, the enrolled speaker vector 154 for an enrolled user 432 is text-independent obtained from one or more audio samples of the respective enrolled user 102 speaking phrases with different terms/words and of different lengths. In these examples, the text-independent enrolled speaker vector may be obtained over time from audio samples obtained from speech interactions the user 102 has with the AED 104 or other device linked to the same account.

Referring to FIG. 4A, the speaker identification process 400a identifies the user 102a (e.g., Barb) that spoke the first query 106 by first extracting, from the initial audio data 402 corresponding to the first query 106, a first speaker-discriminative vector 411 representing characteristics of the first query 106 issued by the user 102a. Here, the speaker identification process 400a may execute a speaker-discriminative model 410 configured to receive the audio data 402 corresponding to the second query 146 as input and generate, as output, the first speaker-discriminative vector 411. The speaker-discriminative model 410 may be a neural network model trained under machine or human supervision to output speaker-discriminative vectors 411. The speaker-discriminative vector 411 output by the speaker-discriminative model 410 may include an N-dimensional vector having a value that corresponds to speech features of the first query 106 that are associated with the user 102a. In some examples, the speaker-discriminative vector 411 is a d-vector. In some examples, the first speaker-discriminative vector 411 includes a set of speaker-discriminative vectors each associated with a different user who is also authorized to control the AED 104. For instance, aside from the user 102a that spoke the first query 106, other authorized users could include other individuals who were present when the user 102a spoke the first query 106 issuing the command 111 to perform the first action and/or individuals that the user 102a added/specified as being authorized.

Once the first speaker-discriminative vector 411 is output from the model 410, the speaker identification process 400a determines whether the extracted speaker-discriminative vector 411 matches any of the enrolled speaker vectors 154 stored on the AED 104 (e.g., in the memory hardware 12) for the enrolled users 432a-n of the AED 104. As described above, the speaker-discriminative model 410 may generate the enrolled speaker vectors 154 for the enrolled users 200 during a voice enrollment process. Each enrolled speaker vector 154 may be used as a reference vector 155 corresponding to a voiceprint or unique identifier representing characteristics of the voice of the respective enrolled user 432.

In some implementations, the speaker identification process 400a uses a comparator 420 that compares the first speaker-discriminative vector 411 to the respective enrolled speaker vector 154 associated with each enrolled user 432a-n of the AED 104. Here, the comparator 420 may generate a score for each comparison indicating a likelihood that the initial audio data 402 corresponding to the first query 106 corresponds to an identity of the respective enrolled user 432, and the identity is accepted when the score satisfies a threshold. When the score does not satisfy the threshold, the comparator 420 may reject the identity of the speaker that issued the first query 106. In some implementations, the comparator 420 computes a respective cosine distance between the first speaker-discriminative vector 411 and each enrolled speaker vector 154 and determines the first speaker-discriminative vector 411 matches one of the enrolled speaker vectors 154 when the respective cosine distance satisfies a cosine distance threshold.

In some examples, the first speaker-discriminative vector 411 is a text-dependent speaker-discriminative vector extracted from a portion of one or more words that correspond to the first query 106 and each enrolled speaker vector 154 is also text-dependent on the same one or more words. The use of text-dependent speaker vectors can improve accuracy in determining whether the first speaker-discriminative vector 411 matches any of the enrolled speaker vectors 154. In other examples, the first speaker-discriminative vector 411 is a text-independent speaker-discriminative vector extracted from the entire initial audio data 402 that corresponds to the first query 106.

When the speaker identification process 400a determines that the first speaker-discriminative vector 411 matches one of the enrolled speaker vectors 154, the process 400a identifies the user 102a that spoke the first query 106 as the respective enrolled user 432a associated with the one of the enrolled speaker vectors 154 that matches the extracted speaker-discriminative vector 411. In the example shown, the comparator 420 determines the match based on the respective cosine distance between the first speaker-discriminative vector 411 and the enrolled speaker vector 154 associated with the enrolled user 432a satisfying a cosine distance threshold. In some scenarios, the comparator 420 identifies the user 102a as the respective enrolled user 432a associated with the enrolled speaker vector 154 having the shortest respective cosine distance from the first speaker-discriminative vector 411, provided this shortest respective cosine distance also satisfies the cosine distance threshold.

Conversely, when the speaker identification process 400a determines that the first speaker-discriminative vector 411 does not match any of the enrolled speaker vectors 154, the process 400a may identify the user 102a that spoke the utterance 106 as a guest user of the AED 104. Accordingly, the query handler 300 may add the guest user to the round robin queue 350, and use the first speaker-discriminative vector 411 as a reference speaker vector 155 representing the speech characteristics of the voice of the guest user. In some instances, the guest user could enroll with the AED 104 and the AED 104 could store the first speaker-discriminative vector 411 as a respective enrolled speaker vector 154 for the newly enrolled user.

Referring back to FIG. 1B, while the digital assistant 105 plays the music 122 as playback audio from the speaker 18 of the AED 104, and when the round robin mode is enabled, the AED 104 receives a second query 146 including a command 118 for the digital assistant 105 to perform a second action. In the example shown, the user 102a that issued the first query 106 also issues the second query 146 "Play Cold Water next" including the command 118 for the digital assistant 105 to play a song (i.e., Cold Water) immediately after playing Track #1 (i.e., Glory). Based on receiving the second query 146, the query handler 300 resolves the identity of the speaker of the second query 146 by performing a speaker identification process 400b (FIG. 4B) on the audio data 402 corresponding to the second query 146 and determines that the second query 146 was issued by the user 102a that issued the first query 106. As described above with reference to FIG. 4A, in implementations where the first query 106 issued by the user 102a includes initial audio data 402 (e.g., the first query 106 was spoken by the first user 102a), the query handler 300 may first perform the speaker identification process 400a on the initial audio data 402 corresponding to the first query 106 to identity the user 102a that issued the first query 106. The speaker identification process 400b may execute on the data processing hardware 12 of the AED 104. The speaker identification process 400b may also execute on the remote system 130. If the speaker verification process 400b on the audio data 402 corresponding to the second query 146 indicates that the second query 146 was spoken by a different user 102 than the user 102 that issued the first query 106, the AED 104 may proceed with adding the action associated with the second query 146 to the round robin queue 350. Conversely, if the speaker verification process 400b on the audio data 402 corresponding to the second query 146 indicates that the second query 146 was spoken by the same user 102 that issued the first query 106, the AED 104 may prevent performance (or at least require input from the one or more other users 102 in the environment (e.g., in FIG. 1B)) of the second action.

Referring again to FIG. 4B with reference to the example of FIG. 1B, in response to receiving the second query 146, the AED 104 resolves the identity of the user 102 that spoke the second query 146 by performing the speaker identification process 400b. The speaker identification process 400b identifies the user 102a that spoke the first query 146 by first extracting, from the audio data 402 corresponding to the first query 146 spoken by the user 102a, a second speaker-discriminative vector 412 representing characteristics of the second query 146. Here, the speaker verification process 400b may execute the speaker-discriminative model 410 configured to receive the audio data 402 as input and generate, as output, the second speaker-discriminative vector 412. As discussed above in FIG. 4A, the speaker-discriminative model 410 may be a neural network model trained under machine or human supervision to output speaker-discriminative vectors 412. The second speaker-discriminative vector 412 output by the speaker-discriminative model 410 may include an N-dimensional vector having a value that corresponds to speech features of the utterance 146 that are associated with the user 102a. In some examples, the speaker-discriminative vector 412 is a d-vector.

Once the second speaker-discriminative vector 412 is output from the speaker-discriminator model 410, the speaker verification process 400b determines whether the extracted speaker-discriminative vector 412 matches a reference speaker vector 155 associated with the first enrolled user 432a stored on the AED 104 (e.g., in the memory hardware 12). The reference speaker vector 155 associated with the first enrolled user 432a may include the respective enrolled speaker vector 154 associated with the first enrolled user 432a. As discussed above, the speaker-discriminative model 410 may generate the enrolled speaker vectors 154 for the enrolled users 432 during a voice enrollment process. Each enrolled speaker vector 154 may be used as a reference vector corresponding to a voiceprint or unique identifier representing characteristics of the voice of the respective enrolled user 432.

In some implementations, the speaker verification process 400b uses a comparator 420 that compares the second speaker-discriminative vector 412 to the reference speaker vector 155 associated with the first enrolled user 432a of the enrolled users 432. Here, the comparator 420 may generate a score for the comparison indicating a likelihood that the second query 146 corresponds to the identity of the first enrolled user 432a, and the identity is accepted when the score satisfies a threshold. When the score does not satisfy the threshold, the comparator 420 may reject the identity. In some implementations, the comparator 420 computes a respective cosine distance between the second speaker-discriminative vector 412 and the reference speaker vector 155 associated with the first enrolled user 432a and determines the second speaker-discriminative vector matches the reference speaker vector 155 when the respective cosine distance satisfies a cosine distance threshold.

When the speaker verification process 400b determines that the second speaker-discriminative vector 412 matches the reference speaker vector 155 associated with the first enrolled user 432a, the process 400b identifies the user 102a that spoke the second query 146 as the first enrolled user 432a associated with the reference speaker vector 155. In the example shown, the comparator 420 determines the match based on the respective cosine distance between the second speaker-discriminative vector 412 and the reference speaker vector 155 associated with the first enrolled user 432a satisfying a cosine distance threshold. In some scenarios, the comparator 420 identifies the user 102a as the respective first enrolled user 432a associated with the reference speaker vector 155 having the shortest respective cosine distance from the second speaker-discriminative vector 412, provided this shortest respective cosine distance also satisfies the cosine distance threshold.

With reference to FIG. 4A above, in some implementations, the speaker identification process 400a determines that the first speaker-discriminative vector 411 does not match any of the enrolled speaker vectors 154, and identifies the user 102a that spoke the first query 106 as a guest user of the AED 104. Accordingly, the speaker verification process 400b may first determine whether the user 102a that spoke the first query 106 was identified by the speaker identification process 400a as an enrolled user 432 or a guest user. When the user 102a is a guest user, the comparator 420 compares the second speaker-discriminative vector 412 to the first speaker-discriminative vector 411 obtained during the speaker identification process 400a. Here, the first speaker-discriminative vector 411 represents the characteristics of the first query 106 spoken by the guest user 102a, and thus, is used as a reference vector to verify whether or not the second query 146 was also spoken by the guest user 102a or another user 102. Here, the comparator 420 may generate a score for the comparison indicating a likelihood that the second query 146 corresponds to the identity of the guest user 102a, and the identity is accepted when the score satisfies a threshold. When the score does not satisfy the threshold, the comparator 420 may reject the identity of the guest user that spoke the second query 146. In some implementations, the comparator 420 computes a respective cosine distance between the first speaker-discriminative vector 411 and the second speaker-discriminative vector 412 and determines the first speaker-discriminative vector 411 matches the second speaker-discriminative vector 412 when the respective cosine distance satisfies a cosine distance threshold.

Referring back to FIG. 1B, based on determining that the second query 146 was spoken by the user 102a that issued the first query 106, the query handler 300 prevents the AED 104 (via the digital assistant 105) from performing the second action, and instead prompts at least another user 102 of the multiple users 102a-c detected in the environment that is different than the user 102a with an opportunity to issue a query. In other words, after the user 102a is determined as the issuer of the first query 106 and the speaker of the second query 146, the query handler 300 first verifies that the other users 102 in the environment do not wish to issue a query before fulfilling the second query 146, thereby preventing the user 102a from monopolizing the AED 104. If the other users 102 in the environment confirm that they do not wish to issue a query, then the digital assistant 105 may proceed to fulfill the second query 146 issued by the user 102a when fulfillment of the first query 106 is complete.

In some implementations, the query handler 300 (via the digital assistant 105), prompts the at least the other user 102 among the multiple users 102 detected in the environment to provide a third query 148 to perform a third action including a corresponding command 119 before performing the second action included in the second query 146 issued by the user 102a. In these implementations, prompting at least the other user 102 among the multiple users 102 includes providing, as output from the AED 104, a user-selectable option that when selected issues a third query 148 to perform a third action including a corresponding command 119. For instance, the digital assistant 105 may generate synthesized speech 123 for audible output from the speaker 18 of the AED 104 (or a speaker in communication with the data processing hardware (e.g., a speaker of the user device 50)) that prompts the user 102b with the opportunity to issue a query, "Jeff, would you like to select a song to play next?". In response, the user 102b (i.e., Jeff) of the multiple users 102b, 102c that are different than the user 102a is shown issuing a third query 148, "Yes, play Red next" in the vicinity of the AED 104. In additional examples, the digital assistant 105 may provide a notification to the user device 50b associated with the user 102b (e.g., Jeff) to display the user-selectable option as a graphical element 210 on the screen of the user device 50b, the graphical element 210 prompting the user 102b with the opportunity to issue the third query 148. Additionally or alternatively to audibly prompting the user 102b, as shown in FIG. 2B, the GUI 200b2 renders, for display, the graphical elements 210 "Jeff, would you like to select a song to play next?", and "Yes" and "No" that allow the user 102b to issue (or opt out from the opportunity to issue) the third query 148. Here, the query handler 300 receives the third query 148 when the user device 50b receives a user input indication indicating selection of the user selectable option selecting one of the graphical elements 210.

With reference to FIGS. 1B and 3, in response to receiving the third query 148, the NLU module 320 executing on the AED 104 (and/or executing on the remote system 130) may identify the words "play Red" as a command 119 to perform a third action (i.e., play music 122). The query handler 300 may first determine whether the command 119 to perform the third action does not violate any active constraints 232 on the digital assistant 105 before updating the round robin queue 350 to include the third action. As discussed above, the active constraints 332 may include the constraint 113 included in the first query 106, the constraint 113 limiting the genre of music (e.g., pop music). Here, the query handler 300 verifies that the action to play "Red" in the third query 148 issued by the user 102b does not conflict with the constraint 113 limiting the genre of music to pop music before adding "Red" to the round robin queue 350. In some implementations, the query handler 300 additionally verifies that the action to play "Cold Water" included in the second query 146 does not conflict with the constraint 113 limiting the genre of music to pop music and/or any other active constraints 332 on the digital assistant 105 before updating the round robin queue 350 to include the command 118 in the second query 146 issued by the user 102a.

While the examples primarily refer to the action of playing music to prevent a single user 102 from monopolizing a playlist, the actions may refer to any category of actions including, but not limited to, search queries, controls for assistant-enabled devices (e.g. smart lights, smart thermostats), and playing other types of media (e.g., podcasts, videos, etc.), etc. For example, the query handler 300 may help users 102 in an environment create a shopping list, thereby ensuring all users 102 are given the opportunity to add items to the shopping list. For instance, the AED 104 may prompt a second user 102 to add an item in response to a first user 102 issuing a query to add multiple items to the shopping list, while still adding the multiple items requested by the first user 102 to the shopping list. Similarly, the query handler 300 may proactively prompt users 102 to be included in an action, such as setting an alarm in the morning. Here the AED 104 may suggest that a second user 102 requests an alarm in response to receiving a request to set an alarm from a first user 102. Moreover, the query handler 300 enables the AED 104 to ensure users 102 are not left out of an interaction, by engaging/prompting a user 102 that has not recently issued a query to join the interaction between the AED 104 and another user 102.

Additionally, the constraints 332 may include a number of limits on actions themselves. For example, a temporal limit for actions may be in place that limits how long of a turn a user 102 has in each entry in the round robin queue 350 (e.g., how many jokes a user 102 can request for each turn in the round robin queue). A temporal limit for the round robin mode may control how long an event applying the constraints 332 lasts. Similarly, a constraint 332 for a threshold number of actions per query may limit a number of actions a user 102 may request per issued query entry in the round robin queue 350 (e.g., allowing a user 102 to request an entire album and/or playlist per turn in the round robin queue 350). Likewise, the threshold number of actions may include a total number of actions per user in the round robin queue 350. For example, a user 102 can only submit 50 additional songs for the round robin queue 350.

Continuing with the example in FIGS. 1B and 2C, after the query handler 300 verifies that the action to play "Red" in the third query 148 issued by the user 102b does not conflict with the constraint 113 limiting the genre of music to pop music, the query handler 300 updates the round robin queue 350 to add "Red" to the identity associated with the user 102b in the round robin queue 350. As shown in FIG. 2C, the GUI 200b3 renders the round robin queue 350 including the user 102a (Barb), the user 102b (Jeff), and the user 102c (Tina) in a repeat order. The action placeholder for Jeff has been updated to include the command 119 for the digital assistant 105 to perform the action "play Red" once the AED 105 completes performing the action (e.g., playing) "play Glory" in the command 111 in the first query 106. In other words, based on the round robin queue 350, when the digital assistant 105 completes performing the first action 111 in the first query 106 issued by the user 102a, it will execute performance of the third action 119 in the third query 148 issued by the user 102b. Additionally, the query handler 300 updates the round robin queue 350 to include the second query 146 issued by the user 102a. As shown, the action placeholder for Barb's second entry has been updated to include the command 118 for the digital assistant 105 to perform the action "play Cold Water" once the AED 105 completes performing the action (e.g., playing) "play Red" in the command 119 in the third query 148 and any additional intervening queries submitted by different users in the environment 102 from the users 102a, 102b before the AED 105 completes performing the action associated with the third query 148.

Referring to FIG. 1C, the AED 104 may notify the user 102a (e.g., Barb) that issued the first query 106 that the second query 146 will be fulfilled after fulfillment of the third query 148 based on the round robin queue 350. For instance, the digital assistant 105 may generate synthesized speech 123 for audible output from the speaker 18 of the AED 104 that states, "Barb, Cold Water will play after Jeff's selection". In additional examples, the digital assistant 105 provides a notification (e.g., update 352) to the user device 50a associated with the user 102a (e.g., Barb) to inform the user 102a of the updated entries in the round robin queue 350.

Figure 5:
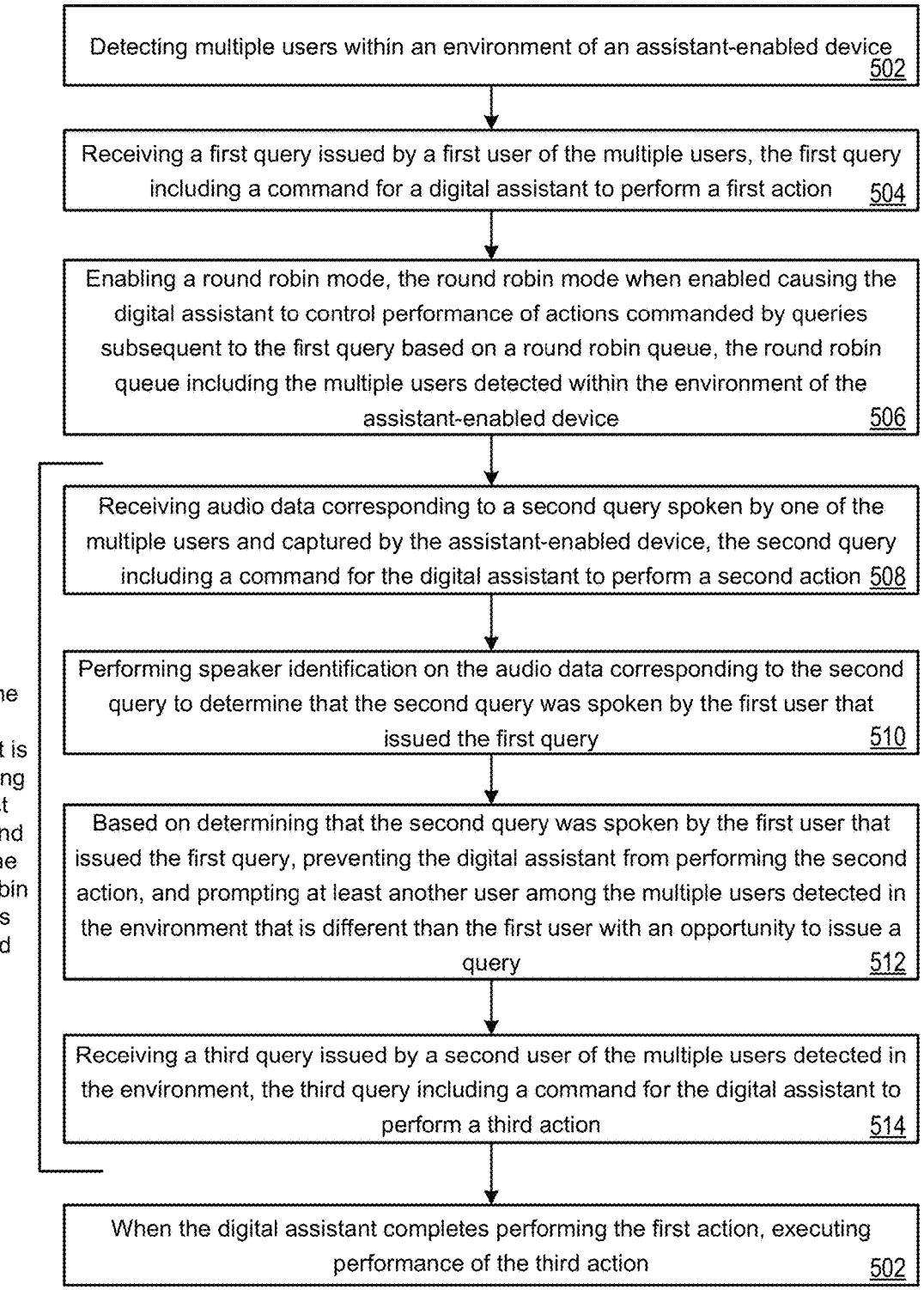
FIG. 5 is a flowchart of an example arrangement of operations for a method of handling voice queries in an environment with multiple users.

FIG. 5 includes a flowchart of an example arrangement of operations for a method 500 of handling queries in an environment with multiple users 102. At operation 502, the method 500 includes detecting multiple users 102 in an environment of an assistant-enabled device (AED) 104. The method 500 also includes, at operation 504, receiving a first query 106 issued by a first user 102a of the multiple users 102. The first query 106 includes a command 111 for a digital assistant 105 to perform a first action. The method 500 further includes, at operation 506, enabling a round robin mode, the round robin mode when enabled causing the digital assistant 105 to control performance of actions commanded by queries subsequent to the first query 106 based on a round robin queue 350. Here, the round robin queue 350 includes the multiple users 102 detected within the environment of the AED 104.

While the digital assistant 105 is performing the first action and when the round robin mode is enabled, the method 500 further includes, at operation 508, receiving audio data 402 corresponding to a second query 146 spoken by one of the multiple users 102 and captured by the AED 104. Here, the second query 146 includes a command 118 for the digital assistant 105 to perform a second action. At operation 510, the method 500 also includes performing speaker identification on the audio data 402 corresponding to the second query 146 to determine that the second query 146 was spoken by the first user 102a that issued the first query 106.

Based on determining that the second query 146 was spoken by the first user 102a that issued the first query 106, the method 500 further includes, at operation 512, preventing the digital assistant 105 from performing the second action, and prompting at least another user 102 among the multiple users 102 detected in the environment that is different than the first user 102a with an opportunity to issue a query. At operation 514, the method 500 includes receiving a third query 148 issued by a second user 102b of the multiple users 102 detected in the environment, the third query 148 including a command 119 for the digital assistant 105 to perform a third action. When the digital assistant 105 completes performing the first action, the method 500 further includes, at operation 502, executing performance of the third action.

Figure 6:
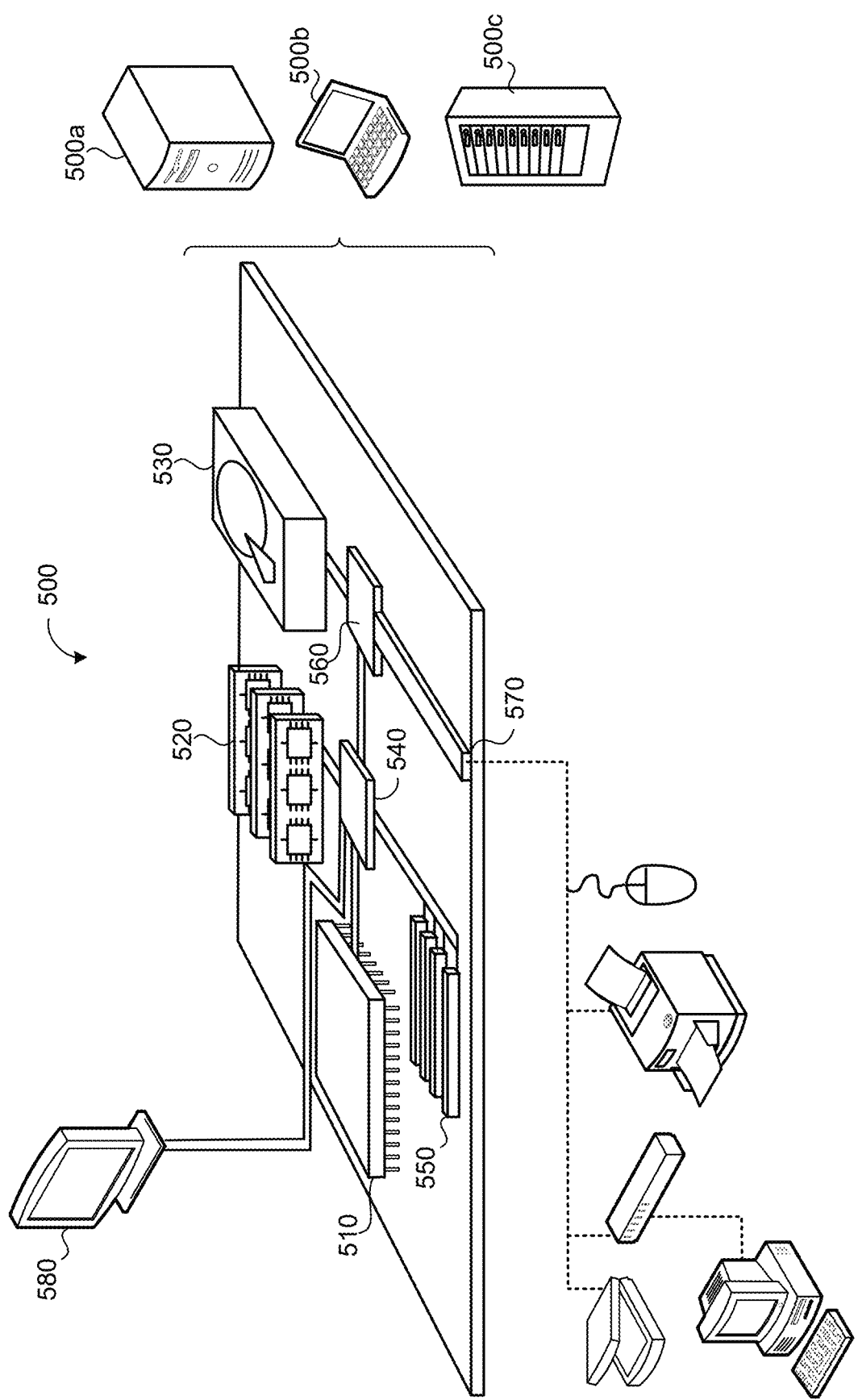
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 (e.g., the data processing hardware 10, 132 of FIG. 1) can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 (e.g., the memory hardware 12, 134 of FIG. 1) may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   detecting multiple users within an environment of an assistant-enabled device;
   receiving a first query issued by a first user of the multiple users, the first query comprising a command for a digital assistant to perform a first action;
   enabling a round robin mode, the round robin mode when enabled causing the digital assistant to control performance of actions commanded by queries subsequent to the first query based on a round robin queue, the round robin queue comprising the multiple users detected within the environment of the assistant-enabled device;
   while the digital assistant is performing the first action and when the round robin mode is enabled:
      receiving audio data corresponding to a second query spoken by one of the multiple users and captured by the assistant-enabled device, the second query comprising a command for the digital assistant to perform a second action;
      performing speaker identification on the audio data corresponding to the second query to determine that the second query was spoken by the first user that issued the first query;
      based on determining that the second query was spoken by the first user that issued the first query:
         preventing the digital assistant from performing the second action; and
         prompting at least another user among the multiple users detected in the environment that is different than the first user with an opportunity to issue a query; and
      receiving a third query issued by a second user of the multiple users detected in the environment, the third query comprising a command for the digital assistant to perform a third action; and
   when the digital assistant completes performing the first action, executing performance of the third action.

2. The method of claim 1, wherein:
   prompting at least the other user among the multiple users detected in the environment comprises providing, as output from a user interface of a user device associated with the second user, a user-selectable option that when selected issues the third query from the second user to perform the third action; and
   wherein receiving the third query issued by the second user is based on receiving a user input indication indicating selection of the user-selectable option.

3. The method of claim 2, wherein providing the user-selectable option as output from the user interface comprises displaying, via the user interface, the user-selectable option as a graphical element on a screen of the user device associated with the second user, the graphical element prompting the second user with the opportunity to issue the third query.

4. The method of claim 2, wherein providing the user-selectable option as output from the user interface comprises providing, via the user interface, the user-selectable option as an audible output from a speaker in communication with the data processing hardware, the audible output prompting the second user with the opportunity to issue the third query.

5. The method of claim 1, wherein the first query further comprises a constraint for subsequent queries, the constraint comprising one of:
   a category of actions;
   a temporal limit for actions;
   a temporal limit for the round robin mode; or
   a threshold number of actions per query.

6. The method of claim 5, wherein the operations further comprise:
   determining that the second query does not violate the constraint in the first query; and
   updating the round robin queue to include the second query spoken by the first user.

7. The method of claim 6, wherein the operations further comprise:
   detecting that the first user has left the environment of the assistant-enabled device; and
   updating the round robin queue to remove the second query spoken by the first user.

8. The method of claim 1, wherein detecting the multiple users within the environment of the assistant-enabled device comprises detecting at least one of the multiple users based on proximity information for a user device associated with the at least one of the multiple users.

9. The method of claim 1, wherein detecting the multiple users within the environment of the assistant-enabled device comprises:
   receiving image data corresponding to a scene of the environment; and
   detecting at least one of the multiple users based on the image data.

10. The method of claim 1, wherein detecting the multiple users within the environment of the assistant-enabled device comprises receiving a list indicating each user of the multiple users to add to the round robin queue.

11. The method of claim 1, wherein the round robin queue comprises, for each corresponding user of the multiple users detected in the environment:
   an identity of the corresponding user; and
   a query count of queries received from the corresponding user.

12. The method of claim 1, wherein receiving the first query issued by the first user comprises receiving, from a user device associated with the first user, a user input indication indicating a user intent to issue the first query.

13. The method of claim 1, wherein receiving the first query issued by the first user comprises receiving initial audio data corresponding to the first query issued by the first user and captured by the assistant-enabled device.

14. The method of claim 13, wherein the operations further comprise, after receiving the initial audio data corresponding to the first query issued by the first user, performing speaker identification on the initial audio data to identify the first user that issued the first query by:
   extracting, from the initial audio data corresponding to the first query issued by the first user, a first speaker-discriminative vector representing characteristics of the first query issued by the first user;
   determining that the extracted speaker-discriminative vector matches any enrolled speaker vectors stored on the assistant-enabled device, each enrolled speaker vector associated with a different respective enrolled user of the assistant-enabled device; and
   based on determining that the first speaker-discriminative vector matches one of the enrolled speaker vectors, identifying the first user that issued the first query as the respective enrolled user associated with the one of the enrolled speaker vectors that matches the extracted speaker-discriminative vector.

15. The method of claim 1, wherein performing speaker identification on the audio data corresponding to the second query to determine that the second query was spoken by the first user that issued the first query comprises:
   extracting, from the audio data corresponding to the second query, a second speaker-discriminative vector representing characteristics of the second query; and
   determining that the second extracted speaker-discriminative vector matches a reference speaker vector for the first user.

16. A system comprising:
data processing hardware; and
memory hardware in communication with the data processing hardware, the memory hardware storing instructions that when executed on the data processing hardware cause the data processing hardware to perform operations comprising:
   detecting multiple users within an environment of an assistant-enabled device;
   receiving a first query issued by a first user of the multiple users, the first query comprising a command for a digital assistant to perform a first action;
   enabling a round robin mode, the round robin mode when enabled causing the digital assistant to control performance of actions commanded by queries subsequent to the first query based on a round robin queue, the round robin queue comprising the multiple users detected within the environment of the assistant-enabled device;
   while the digital assistant is performing the first action and when the round robin mode is enabled:
      receiving audio data corresponding to a second query spoken by one of the multiple users and captured by the assistant-enabled device, the second query comprising a command for the digital assistant to perform a second action;
      performing speaker identification on the audio data corresponding to the second query to determine that the second query was spoken by the first user that issued the first query;
      based on determining that the second query was spoken by the first user that issued the first query:
         preventing the digital assistant from performing the second action; and
         prompting at least another user among the multiple users detected in the environment that is different than the first user with an opportunity to issue a query; and
      receiving a third query issued by a second user of the multiple users detected in the environment, the third query comprising a command for the digital assistant to perform a third action; and
      when the digital assistant completes performing the first action, executing performance of the third action.

17. The system of claim 16, wherein:
prompting at least the other user among the multiple users detected in the environment comprises providing, as output from a user interface of a user device associated with the second user, a user-selectable option that when selected issues the third query from the second user to perform the third action; and
wherein receiving the third query issued by the second user is based on receiving a user input indication indicating selection of the user-selectable option.

18. The system of claim 17, wherein providing the user-selectable option as output from the user interface comprises displaying, via the user interface, the user-selectable option as a graphical element on a screen of the user device associated with the second user, the graphical element prompting the second user with the opportunity to issue the third query.

19. The system of claim 17, wherein providing the user-selectable option as output from the user interface comprises providing, via the user interface, the user-selectable option as an audible output from a speaker in communication with the data processing hardware, the audible output prompting the second user with the opportunity to issue the third query.

20. The system of claim 16, wherein the first query further comprises a constraint for subsequent queries, the constraint comprising one of:
   a category of actions;
   a temporal limit for actions;
   a temporal limit for the round robin mode; or
   a threshold number of actions per query.

21. The system of claim 20, wherein the operations further comprise:
   determining that the second query does not violate the constraint in the first query; and
   updating the round robin queue to include the second query spoken by the first user.

22. The system of claim 21, wherein the operations further comprise:
   detecting that the first user has left the environment of the assistant-enabled device; and
   updating the round robin queue to remove the second query spoken by the first user.

23. The system of claim 16, wherein detecting the multiple users within the environment of the assistant-enabled device comprises detecting at least one of the multiple users based on proximity information for a user device associated with the at least one of the multiple users.

24. The system of claim 16, wherein detecting the multiple users within the environment of the assistant-enabled device comprises:
   receiving image data corresponding to a scene of the environment; and
   detecting at least one of the multiple users based on the image data.

25. The system of claim 16, wherein detecting the multiple users within the environment of the assistant-enabled device comprises receiving a list indicating each user of the multiple users to add to the round robin queue.

26. The system of claim 16, wherein the round robin queue comprises, for each corresponding user of the multiple users detected in the environment:
   an identity of the corresponding user; and
   a query count of queries received from the corresponding user.

27. The system of claim 16, wherein receiving the first query issued by the first user comprises receiving, from a user device associated with the first user, a user input indication indicating a user intent to issue the first query.

28. The system of claim 16, wherein receiving the first query issued by the first user comprises receiving initial audio data corresponding to the first query issued by the first user and captured by the assistant-enabled device.

29. The system of claim 28, wherein the operations further comprise, after receiving the initial audio data corresponding to the first query issued by the first user, performing speaker identification on the initial audio data to identify the first user that issued the first query by:
   extracting, from the initial audio data corresponding to the first query issued by the first user, a first speaker-discriminative vector representing characteristics of the first query issued by the first user;
   determining that the extracted speaker-discriminative vector matches any enrolled speaker vectors stored on the assistant-enabled device, each enrolled speaker vector associated with a different respective enrolled user of the assistant-enabled device; and
   based on determining that the first speaker-discriminative vector matches one of the enrolled speaker vectors, identifying the first user that issued the first query as the respective enrolled user associated with the one of the enrolled speaker vectors that matches the extracted speaker-discriminative vector.

30. The system of claim 16, wherein performing speaker identification on the audio data corresponding to the second query to determine that the second query was spoken by the first user that issued the first query comprises:
   extracting, from the audio data corresponding to the second query, a second speaker-discriminative vector representing characteristics of the second query; and
   determining that the second extracted speaker-discriminative vector matches a reference speaker vector for the first user.

* * * * *